US011358308B2

United States Patent
Foreman et al.

(10) Patent No.: US 11,358,308 B2
(45) Date of Patent: Jun. 14, 2022

(54) PRODUCTS COMPRISING REINFORCING FIBRES AND SHAPE MEMORY ALLOY WIRES AND METHODS OF MAKING THEREOF

(71) Applicant: QinetiQ Limited, Hampshire (GB)

(72) Inventors: Andrew David Foreman, Aldershot (GB); Charlotte Bree Meeks, Farnborough (GB); Robert West, Farnborough (GB)

(73) Assignee: QINETIQ LIMITED, Hampshire (GB)

( * ) Notice: Subject to any disclaimer, the term of this patent is extended or adjusted under 35 U.S.C. 154(b) by 120 days.

(21) Appl. No.: 16/623,341

(22) PCT Filed: Jun. 26, 2018

(86) PCT No.: PCT/EP2018/067142
§ 371 (c)(1),
(2) Date: Dec. 16, 2019

(87) PCT Pub. No.: WO2019/002310
PCT Pub. Date: Jan. 3, 2019

(65) Prior Publication Data
US 2021/0146576 A1    May 20, 2021

(30) Foreign Application Priority Data
Jun. 28, 2017    (GB) .................................... 1710288

(51) Int. Cl.
*B29B 11/00*    (2006.01)
*B32B 5/00*    (2006.01)
(Continued)

(52) U.S. Cl.
CPC ................. *B29B 11/16* (2013.01); *B32B 5/26* (2013.01); *B29C 70/24* (2013.01); *B32B 5/024* (2013.01);
(Continued)

(58) Field of Classification Search
CPC ......... B29B 11/00; B29B 11/10; B29B 11/16; B32B 5/00; B32B 5/20; B32B 5/26
See application file for complete search history.

(56) References Cited

U.S. PATENT DOCUMENTS

| 7,216,831 B2 * | 5/2007 | Wood | .................... F02K 1/1207 |
| | | | 244/99.8 |
| 2005/0146076 A1 * | 7/2005 | Alexander | ........... D03D 1/0088 |
| | | | 264/257 |

FOREIGN PATENT DOCUMENTS

| CN | 101044018 A | 9/2007 |
| CN | 103266398 A | 8/2013 |

(Continued)

OTHER PUBLICATIONS

International Search Report and Written Opinion for PCT Patent App. No. PCT/EP2018/067142 (dated Sep. 20, 2018).
(Continued)

*Primary Examiner* — Jacob T Minskey
*Assistant Examiner* — Matthew Hoover
(74) *Attorney, Agent, or Firm* — Kenealy Vaidya LLP

(57) ABSTRACT

Some embodiments are directed to a three-dimensional (3D) preform including reinforcing fibres and shape memory alloys (SMA) wires and a composite material including a polymer matrix with a 3D-preform embedded therein, wherein the 3D-preform includes reinforcing fibres and shape memory alloy (SMA) wires.

30 Claims, 9 Drawing Sheets

(51) Int. Cl.
  *B29B 11/16* (2006.01)
  *B32B 5/26* (2006.01)
  *B29C 70/24* (2006.01)
  *B32B 5/02* (2006.01)
  *D03D 25/00* (2006.01)

(52) U.S. Cl.
  CPC ... *B32B 2260/023* (2013.01); *B32B 2260/046* (2013.01); *B32B 2262/101* (2013.01); *B32B 2262/106* (2013.01); *B32B 2307/558* (2013.01); *B32B 2605/18* (2013.01); *D03D 25/005* (2013.01)

(56) References Cited

FOREIGN PATENT DOCUMENTS

| | | | |
|---|---|---|---|
| CN | 106149162 A | 11/2016 | |
| CN | 106273551 A | 1/2017 | |
| EP | 2028309 A1 | 2/2009 | |
| EP | 1871288 B1 | 2/2016 | |
| EP | 3031604 A1 | 6/2016 | |
| EP | 3135473 A1 | 3/2017 | |
| KR | 1020140065791 A | 5/2014 | |
| WO | WO2008147754 A1 | 12/2008 | |

OTHER PUBLICATIONS

Search Report for GB Patent App. No. 1710288.0 (dated Dec. 22, 2017).

Lau, K.-T., et al., "Low velocity impacton shape memory alloy stitched composite plates," Smart Materials and Structures 2004;13:364-370.

Angioni, S. L., et al., "Impact damage resistance and damage suppression properties of shape memory alloys in hybrid composites—a review," Smart Materials and Structure 2011;20:1-24.

\* cited by examiner (a)

(b)

(c)

(d)

(a) (b)

(a)

(b)

(c)

(a)

(b)

(a)

(b)

PRODUCTS COMPRISING REINFORCING FIBRES AND SHAPE MEMORY ALLOY WIRES AND METHODS OF MAKING THEREOF

CROSS REFERENCE TO RELATED APPLICATION(S)

This application is a national phase filing under 35 C.F.R. § 371 of and claims priority to PCT Patent Application No. PCT/EP2018/067142, filed on Jun. 26, 2018, which claims the priority benefit under 35 U.S.C. § 119 of British Patent Application No. 1710288.0, filed on Jun. 28, 2017, the contents of each of which are hereby incorporated in their entireties by reference.

BACKGROUND

Some embodiments relate generally to three-dimensional (3D) preforms including reinforcing fibres and shape memory alloy (SMA) wires. Some embodiments also relate to composite materials including a polymer matrix with a 3D-preform embedded therein, wherein the 3D-preform includes reinforcing fibres and shape memory alloy (SMA) wires.

Composite materials having a high strength to weight ratio may be made by embedding relatively high modulus fibres in a relatively low modulus polymer matrix. These materials are, for example, particularly useful in many aerospace, automotive and marine applications. These materials may be made by producing a fibre preform and impregnating with polymer or by layering pre-impregnated plies of fibres. However, many composite materials of this type may have relatively poor resistance to impact damage, which in the case of aircraft structure could be imparted in use (e.g. by tool drop, runway debris or bird strikes). In addition, the inter-laminar properties of these composite materials may be relatively poor, with low resistance to delamination. Further, these composite materials are generally made in the form of thin sheets and must or should be cut and layered to make larger and more complex 3D structures. It is therefore desirable to provide alternative and/or improved composite materials, which may, for example, be suitable for aerospace applications.

SUMMARY

In accordance with a first aspect of some embodiments there is provided a composite material including a polymer matrix with a 3D-prefrom embedded therein, wherein the 3D-preform includes reinforcing fibres and SMA wires.

In accordance with a second aspect of some embodiments there is provided a 3D-preform including reinforcing fibres and SMA wires.

In accordance with a third aspect of some embodiments there is provided a method of making a composite material according to the first aspect of some embodiments, the method including forming a 3D-preform embedded in an uncured polymer matrix and curing the polymer matrix. In certain embodiments, the method includes forming a 3D-preform according to the second aspect of some embodiments, applying a polymer matrix to the 3D-preform and curing the polymer matrix with the 3D-preform embedded therein. In certain embodiments, the method includes forming a 3D-preform embedded in an uncured polymer matrix by layering pre-impregnated structures including reinforcing fibres, SMA wires or a combination thereof and linking the pre-impregnated structures to form a 3D-preform. The pre-impregnated structures may, for example, be linked to form a 3D-preform by one or more of stitching, tufting and z-pinning.

In accordance with a fourth aspect of some embodiments there is provided a method of making a 3D-preform according to the second aspect of some embodiments, the method including providing the reinforcing fibres and SMA wires and making a 3D-preform by one or more of weaving, braiding, knitting, stitching, tufting and z-pinning. In certain embodiments, the method including forming layers of reinforcing fibres, SMA wires or a combination thereof and linking the layers by one or more of weaving, stitching and tufting.

In accordance with a fifth aspect of some embodiments there is provided a use of a composite material according to the first aspect of some embodiments to make an article of manufacture.

In accordance with a sixth aspect of some embodiments there is provided an article of manufacture made of or including a composite material or 3D-preform according to the first or second aspect of some embodiments.

In certain embodiments, the article of manufacture is a part for a vehicle such as an aircraft, a marine craft or an automobile. In certain embodiments, the article of manufacture is a protective cover (e.g. for a battery, fuel tank, braking system). In certain embodiments, the article of manufacture is a forward-facing surface of a vehicle such as a leading edge, nose cone or nacelle.

In certain embodiments of any aspect of some embodiments, the 3D-preform includes two or more layers stacked on top of each other and held together by one or more filament(s) transversing two or more of the layers. In certain embodiments, one or more of the layers includes reinforcing fibres, SMA wires or a combination thereof. In certain embodiments, each of the layers independently includes reinforcing fibres, SMA wires or a combination thereof. In certain embodiments, each of the layers is independently non-interlaced (i.e. unidirectional), woven, braided or knitted. In certain embodiments, one or more of the layers (e.g. each of the layers) includes an uncured polymer matrix (i.e. is a pre-impregnated layer).

In certain embodiments, one or more of the filament(s) transversing the two or more layers is/are reinforcing fibre, SMA wire or a combination thereof. In certain embodiments, one or more of the filament(s) transversing the two or more layers is/are woven, stitched, tufted or z-pinned.

In certain embodiments, the 3D-preform is an orthogonal 3D woven preform, an angle-interlock 3D woven preform or a layer-to-layer 3D woven preform.

In certain embodiments, the 3D-preform is a fully interlaced woven preform, a fully braided preform or a fully knitted preform.

Certain embodiments of any aspect of some embodiments may provide one of more of the following advantages:
  good impact performance;
  good penetration resistance;
  good inter-laminar properties (e.g. good inter-laminar sheer strength);
  ability to make complex 3D structures in a single piece (e.g. T and X shapes) and in a single process (e.g. no need for layering to increase thickness) to near-net shape;
  good flexural modulus;
  good compressive strength;
  highly porous which may, for example, decrease resin infusion time;

decreased crimping of reinforcing fibres and/or SMA wires.

The details, examples and preferences provided in relation to any particulate one or more of the stated aspects of some embodiments will be further described herein and apply equally to all aspects of some embodiments. Any combination of the embodiments, examples and preferences described herein in all possible variations thereof is encompassed by some embodiments unless otherwise indicated herein, or otherwise clearly contradicted by context.

BRIEF DESCRIPTION OF THE FIGURES

Aspects of some embodiments will be described in more detail, with reference to the appended drawings showing embodiment(s) of some embodiments.

FIG. 2 (b) shows an example of a triaxial braided pattern in a 2D braided material.

DETAILED DESCRIPTION

Figure 1:
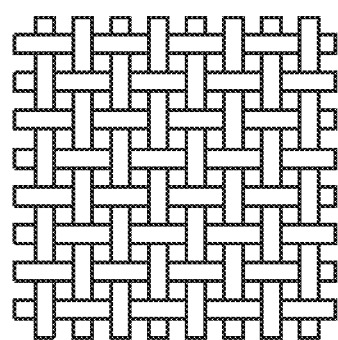
FIG. 1(a) shows an example of a plain pattern in a 2D woven material.
FIG. 1(b) shows an example of a twill pattern in a 2D woven material.
FIG. 1(c) shows an example of a satin pattern in a 2D woven material.
FIG. 1(d) shows an example of a triaxial woven pattern in a 2D woven material.
Figure 1:
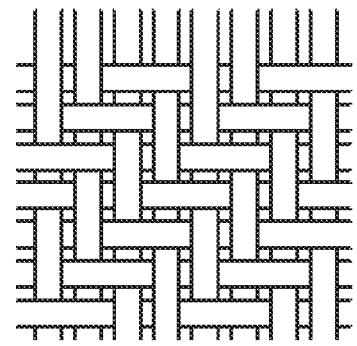
Figure 1:
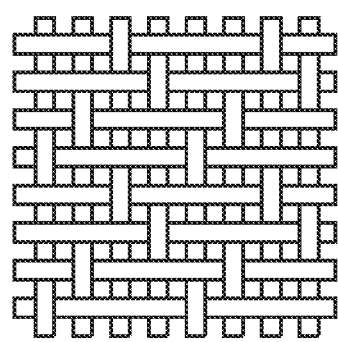
Figure 1:
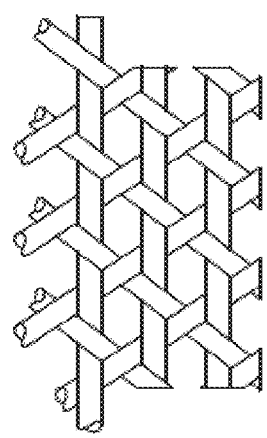

Some embodiments may be described with reference to the accompanying drawings, in which currently preferred embodiments of some embodiments are shown. Some embodiments may, however, be embodied in many different forms and should not be construed as limited to the embodiments set forth herein; rather, these embodiments are provided for thoroughness and completeness, and fully convey the scope of some embodiments to the skilled person.

There is provided herein a 3D-preform including reinforcing fibres and SMA wires. There is also provided herein a composite material including a polymer matrix and a 3D-preform embedded within the polymer matrix. The 3D-preform may, for example, be fully embedded by the polymer matrix (i.e. fully covered by the polymer matrix). Alternatively, the 3D-preform may be partially embedded by the polymer matrix (i.e. partially covered by the polymer matrix and partly uncovered).

3D-Preform

The 3D-preform described herein includes reinforcing fibres and SMA wires. The term "3D-preform" refers to any unitary three-dimensional structure. The 3D-preform may be embedded in an uncured polymer matrix or may be suitable for embedding in a polymer matrix but has not yet been in contact with a polymer matrix. The 3D-preform may include multiple fibres (e.g. tows of fibres) that are disposed in a three-mutually-perpendicular-planes relationship. The 3D-preform may be a fabric having a third dimension such that the X (longitudinal) and Y (cross) fibres are linked (e.g. intertwined, interlaced or intermeshed) with a Z (vertical) direction fibre. The Z direction fibre can be positioned in any direction outside the X/Y 2D plane.

In certain embodiments, the 3D-preform includes 2 or more layers that are stacked on top of each other and are held together by one or more filaments transversing two or more of the layers. The precise number of layers used may vary depending on the thickness of each layer and the intended application of the 3D-preform or composite material.

In certain embodiments, the 3D-preform includes 3 or more, or 4 or more, or 5 or more, or 6 or more, or 7 or more, or 8 or more, or 9 or more, or 10 or more, layers that are stacked on top of each other. In certain embodiments, the 3D-preform includes up to about 100, or up to about 90, or up to about 80, or up to about 70, or up to about 60, or up to about 50, or up to about 40, or up to about 30, or up to about 20, layers that are stacked on top of each other. In certain embodiments, the 3D-preform includes from about 4 to about 30 layers that are stacked on top of each other. In certain embodiments, the 3D-preform includes from about 20 to about 30 layers that are stacked on top of each other. By "stacked on top of each other" it is meant that each layer is arranged such that the major planes of each layer are substantially parallel to each other.

When stacked, the direction of the reinforcing fibres and/or SMA wires in each layer relative to the direction of the reinforcing fibres and/or SMA wires in adjacent layers is arranged depending on the performance requirements for the particular fabric or composite material. In certain embodiments, the layers are stacked such that the reinforcing fibres and/or SMA wires in each layer are parallel to the reinforcing fibres and/or SMA wires in one or both adjacent layers. In certain embodiments, the layers are stacked such that the reinforcing fibres and/or SMA wires in each layer are substantially perpendicular to the reinforcing fibres and/or SMA wires in one or both adjacent layers.

The term "layer" refers to a unitary two-dimensional (2D) structure. In certain embodiments, each layer may independently be non-interlaced, woven, braided or knitted. In other words, the structure of each layer (e.g. whether it is non-interlaced, woven, braided or knitted) may be different. In certain embodiments, the structure of each layer is the same. Thus, in certain embodiments, all the layers in the 3D-preform are non-interlaced. In certain embodiments, all the layers in the 3D-preform are woven.

In certain embodiments, all the layers in the 3D-preform are braided. In certain embodiments, all the layers in the 3D-preform are knitted.

The term "non-interlaced" means that the fibres making up the layer (e.g. the reinforcing fibres and/or SMA wires) are unidirectional in that they do not cross and are not intricately linked together. Thus, in a non-interlaced layer, the fibres of the layer (e.g. the reinforcing fibres and/or SMA wires) may be arranged so that they are substantially or completely parallel to each other. When two or more layers are non-interlaced layers, the fibres of each of the two or more layers (e.g. the reinforcing fibres and/or SMA wires) may be arranged such that they are not parallel to the fibres of the adjacent layer(s). For example, the fibres of the two or more layers (e.g. the reinforcing fibres and/or SMA wires) may be arranged such that they are perpendicular to the fibres of the adjacent layer(s). For example, the fibres of the two or more layers (e.g. the reinforcing fibres and/or SMA wires) may be arranged such that they are at about 30° to about 60° (for example about 45°) to the fibres of the adjacent layer(s).

Non-interlaced layers may, for example, be pre-impregnated with an uncured polymer matrix (pre-preg). Non-interlaced layers may, for example, be held together by a stabilising fibre or thread. The stabilising fibre or thread may, for example, be a thermoplastic fibre or thread such as a polyester fibre or thread. The stabilising fibre or thread may, for example, be an aramid fibre or thread such as Kevlar®. A stabilising fibre or thread is any fibre or thread that does not affect the reinforcing or impact properties of the fabric. The stabilising thread may, for example, form single-layered, biaxial, triaxial or quadriaxial fabric. The stabilising thread may, for example, form layers of non-crimp fabric (NCF) or non-crimp woven fabric (NCW). In non-crimp fabric, the fibres of each layer can be positioned at any angle relative to each other. In non-crimp woven fabric, the fibres of each layer can be positioned at 0° or 90° relative to each other.

The term "woven" means that the layer is made by a weaving process involving the interlacing of at least two sets of fibres according to a particular pattern. For example, a woven layer may can include or can consist of two sets of fibres (sometimes referred to as warp and weft) that lie perpendicular to each other in the layer plane. For example, a woven layer may consist of three sets of fibres (sometimes referred to as +warp, −warp and filling) or four sets of fibres that are interlaced in the layer plane. For example, the woven layer may be a biaxial or triaxial or quadriaxial woven layer.

The woven layer may, for example, be made according to any suitable pattern. For example, the woven layer may have a uniform plain pattern in which the fibre in one direction (e.g. warp) passes alternatively over and under each fibre that lies perpendicular to it (e.g. weft). For example, the woven layer may have a twill pattern in which the fibre that lies in one direction (e.g. warp) passes over and under two or more fibres that lie perpendicular to it (e.g. weft). In the twill pattern, the weaving of each fibre in one direction may be started at a different point along the fibres lying perpendicular to it in order to give the woven layer a diagonal pattern. For example, the woven layer may have a satin pattern in which the fibre in one direction (e.g. warp) alternatively pass over and under two or more fibres that lie perpendicular to it (e.g. weft). FIG. 1 shows examples of a plain (FIG. 1(a)), twill (FIG. 1(b)) and satin (FIG. 1(c)) pattern in a 2D woven layer. The woven layer may, for example, be biaxial or triaxial. FIG. 1(d) shows a triaxial woven pattern. Woven layers with fewer intersections (e.g. fewer places where fibres are passed over or under) may have a smoother surface and lower crimp and will also have better wettability and drapability. However, woven layers with fewer intersections may also have lower dimensional stability.

Figure 2:
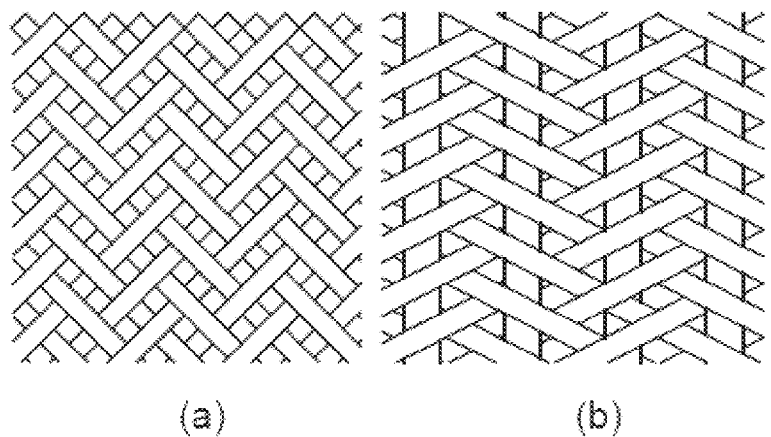
FIG. 2 (a) shows an example a biaxial braided pattern in a 2D braided material.

The term "braided" means that the layer is made by a braiding process involving the interlacing of a single set of fibres according to a particular pattern. A braided layer may, for example, be a layer consisting of braiding fibres crossing each other in a diagonal direction to the selvedge. The fibre density may, for example, be even. The layer may, for example, have a closed fabric appearance. The braid pattern may, for example, be a diamond, regular or hercules braid. For example, the braided layer may be a biaxial or triaxial braided layer. FIG. 2 shows examples of a biaxial braided layer (FIG. 2(a)) and a triaxial braided pattern (FIG. 2(b)).

Figure 3:
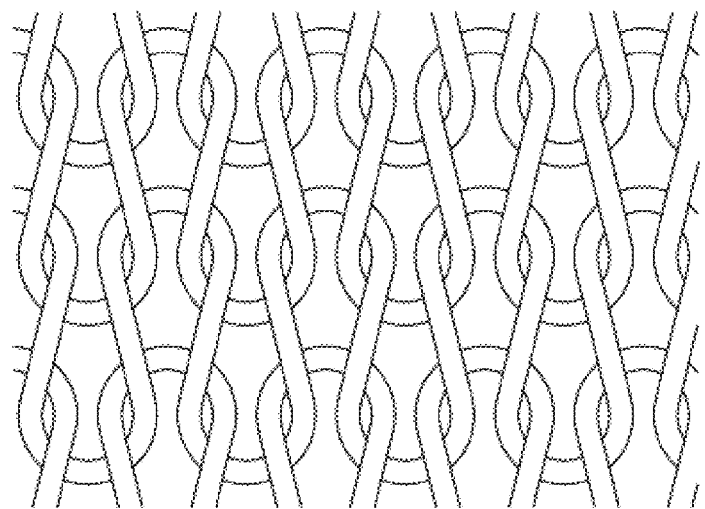
FIG. 3 shows an example of a knitted pattern.

The term "knitted" means that the layer is made by a process involving the interloping of loops of fibre. Adjacent rows or columns of connected loops may also be connected to each other. Thus, a knitted layer may, for example, consist of two or more consecutive rows of interlocking loops. The knitted layer may, for example, be uniaxial or biaxial. FIG. 3 shows an example of a knitted pattern.

In certain embodiments, one or more of the layers independently include reinforcing fibre, SMA wire or a combination thereof. In certain embodiments, at least about 50%, or at least about 55%, or at least about 60%, or at least about 65%, or at least about 70%, or at least about 75%, or at least about 80%, or at least about 85%, or at least about 90%, or at least about 95%, of the layers include reinforcing fibre, SMA wire, or a combination thereof. In certain embodiments, all of the layers (100%) include reinforcing fibre, SMA wire or a combination thereof.

The reinforcing fibres and/or SMA wires may, for example, be in the form of tows (a bundle of more than one reinforcing fibre or more than one SMA wire respectively where the bundles are not intertwined). Each tow may, for example, be treated as an individual fibre in the manufacturing (e.g. weaving, braiding or knitting) process. Where the layers include a combination of reinforcing fibre and SMA wire, the layers may include combination tows, which each include one or more reinforcing fibres and one or more SMA wires. For example, each combination tow may include a tow of reinforcing fibres and at least one SMA wire on a lateral edge of the tow of reinforcing fibres. In certain embodiments, one or more of the combination tows include a tow of reinforcing fibres and two SMA wires, one at each lateral edge of the tow of reinforcing fibre. If more than two SMA wires per tow of reinforcing fibres is required, further SMA wires may be incorporated at regular intervals across the widths of the respective tows. For example, if more than two SMA wires per tow of reinforcing fibres is required, the further SMA wires may be incorporated in between the tows of reinforcing fibres.

In the layers that include reinforcing fibre, SMA wire or a combination thereof, each layer may independently include at least about 40% volume fraction of reinforcing fibre, SMA wire or a combination thereof. For example, in the layers that include reinforcing fibre, SMA wire or a combination thereof, each layer may independently include at least about 45% volume fraction or at least about 50% volume fraction or at least about 55% volume fraction or at least about 60% volume fraction or at least about 65% volume fraction or at least about 70% volume fraction or at least about 75% volume fraction or at least about 80% volume fraction or at least about 85% volume fraction or at least about 90% volume fraction or at least about 95% volume fraction or at least about 96% volume fraction or at least about 97% volume fraction or at least about 98% volume fraction or at least about 99% volume fraction reinforcing fibre, SMA wire or a combination thereof. For example, all of the layers that include reinforcing fibre, SMA wire or a combination thereof, may include at least about 40% volume fraction or at least about 45% volume fraction or at least about 50% volume fraction or at least about 55% volume fraction or at least about 60% volume fraction or at least about 65% volume fraction or at least about 70% volume fraction or at least about 75% volume fraction or at least about 80% volume fraction or at least about 85% volume fraction or at least about 90% volume fraction or at least about 95% volume fraction or at least about 96% volume fraction or at least about 97% volume fraction or at least about 98% volume fraction or at least about 99% volume fraction reinforcing fibre, SMA wire or a combination thereof. In the layers that include reinforcing fibre, SMA wire or a combination thereof, each layer may independently include up to about 100% volume fraction, for example 100% volume fraction, reinforcing fibre, SMA wire or a combination thereof. For example, all of the layers that include reinforcing fibre, SMA wire or a combination thereof may include up to about 100% volume fraction, for example 100% volume fraction, reinforcing fibre, SMA wire or a combination thereof.

In certain embodiments, the 3D-preform includes a number of layers consisting of the reinforcing fibres and a number of layers consisting of SMA wires or a combination of reinforcing fibres and SMA wires. The ratio of layers consisting of only reinforcing fibres to layers consisting of SMA wires or a combination of reinforcing fibres and SMA wires may, for example, range from about 20:1 to about 1:20. For example, the ratio of layers consisting of only reinforcing fibres to layers consisting of SMA wires or a combination of reinforcing fibres and SMA wires may range from about 15:1 to about 1:15 or from about 10:1 to about 1:10 or from about 5:1 to about 1:5 or from about 4:1 to about 1:4 or from about 3:1 to about 1:3 or from about 2:1 to about 1:2. For example, the ratio of layers consisting of only reinforcing fibres to layers consisting of SMA wires or a combination of reinforcing fibres and SMA wires may range from about 20:1 to about 1:1 or from about 15:1 to about 1:1 or from about 10:1 to about 1:1 or from about 5:1 to about 1:1 or from about 20:1 to about 2:1 or from about 15:1 to about 2:1 or from about 10:1 to about 2:1 or from about 5:1 to about 2:1. For example, the ratio of layers consisting of only reinforcing fibres to layers consisting of SMA wires or a combination of reinforcing fibres and SMA wires may range from about 6:1 to about 1:6 or from about 3:1 to about 1:3.

The one or more filament(s) transversing two or more of the layers may sometimes be referred to as the z-yarn, warp weaver or binder yarn (particularly for 3D woven preforms). The one or more filament(s) extend through the thickness of the 3D-preform connecting the layers. The one or more filament(s) may, for example, extend through the entire thickness of the 3D-preform or may each extend between only certain layers.

Each of the layers of the 3D-preform must or should have at least one filament extending therethough in order to hold all of the layers of the 3D-preform together.

In certain embodiments, the one or more filament(s) transversing two or more of the layers are each independently reinforcing fibre, SMA wire or a combination thereof. For example, all of the one or more filament(s) transversing two or more of the layers are reinforcing fibre, SMA wire or a combination thereof. In certain embodiments, one or more of the one or more filament(s) transversing two or more of the layers is/are reinforcing fibre. In certain embodiments, all of the one or more filament(s) transversing two or more of the layers are reinforcing fibre. In certain embodiments, the reinforcing fibre is carbon fibre, for example tows of carbon fibre. In certain embodiments, one or more of the one or more filament(s) transversing two or more of the layers is/are SMA wire. In certain embodiments, all of the one or more filament(s) transversing two or more of the layers are SMA wires.

Where the filament(s) are a combination of reinforcing fibre and SMA wire, each reinforcing fibre or SMA wire may be inserted through the layers separately to the other reinforcing fibres and SMA wires. Each filament may, for example, be in the form of tows (bundles of reinforcing fibres or bundles of SMA wires that are not intertwined). Where the filament(s) include a combination of reinforcing fibre and SMA wire, the filament(s) may include combination tows, which each include one or more reinforcing fibres and one or more SMA wire. The combination tows may, for example, include a tow of reinforcing fibres with one or more SMA wires embedded therein.

In certain embodiments, the one or more filament(s) may independently transverse 3 or more, or 4 or more, or 5 or more, or 6 or more, or 7 or more, or 8 or more, or 9 or more, or 10 or more, layers in the 3D-preform. In certain embodiments, the one or more filament(s) may all transverse 3 or more, or 4 or more, or 5 or more, or 6 or more, or 7 or more, or 8 or more, or 9 or more, or 10 or more, layers in the 3D-preform. In certain embodiments, the one or more filament(s) may independently transverse up to about 100, or up to about 90, or up to about 80, or up to about 70, or up to about 60, or up to about 50, or up to about 40, or up to about 30, or up to about 20, layers in the 3D-preform. In certain embodiments, the one or more filament(s) may all transverse up to about 100, or up to about 90, or up to about 80, or up to about 70, or up to about 60, or up to about 50, or up to about 40, or up to about 30, or up to about 20, layers in the 3D-preform. In certain embodiments, the one or more filament(s) may independently transverse all of the layers in the 3D-preform (i.e. 100% of the layers in the 3D-preform from one surface to the other). In certain embodiments, the one or more filament(s) may all transverse all of the layers in the 3D-preform (from one surface to the other).

In certain embodiments, each of the one or more filament(s) may transverse the same or a different number of layers in total. Each of the one or more filament(s) may independently transverse the same or different layers within the 3D-preform. For example, each filament may transverse two layers in total but transverse subsequent pairs of layers (e.g. the first filament may transverse the first and second layers, the second filament may transverse the second and third layers etc.).

In certain embodiments, each of the one or more filament(s) transversing two or more of the layers of the 3D-preform may independently be woven, braided, stitched, tufted or z-pinned. In other words, each of the one or more filament(s) transversing two or more of the layers of the 3D-preform are inserted into the structure by weaving, braiding, stitching, tufting or z-pinning. In certain embodiments, all of the one or more filament(s) transversing two or more of the layers of the 3D-preform are woven. In certain embodiments, all of the one or more filament(s) transversing two or more of the layers of the 3D-preform are braided. In certain embodiments, all of the one or more filament(s) transversing two or more of the layers of the 3D-preform are stitched. In certain embodiments, all of the one or more filament(s) transversing two or more of the layers of the 3D-preform are tufted. In certain embodiments, all of the one or more filament(s) transversing two or more of the layers of the 3D-preform are z-pinned.

Figure 4:
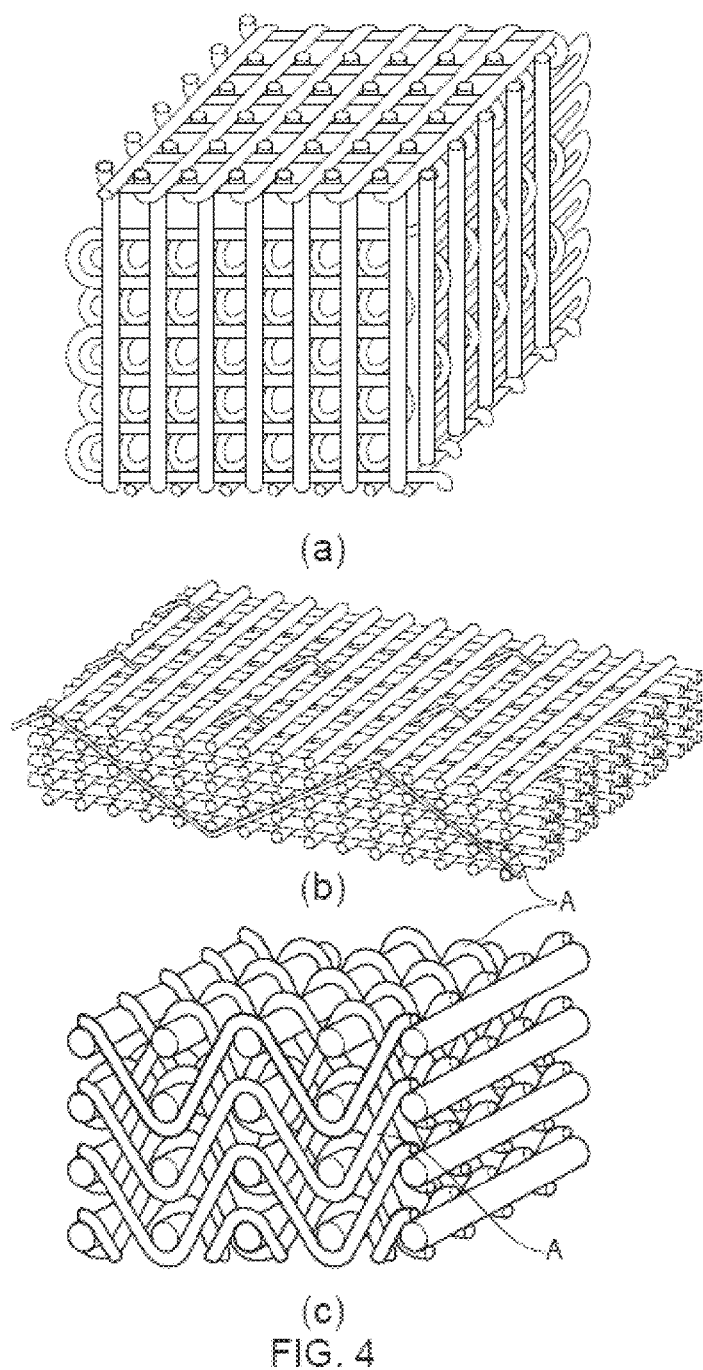
FIG. 4(a) shows an example of a 3D orthogonal weave material.
FIG. 4(b) shows an example of a 3D angle-interlock weave material.
FIG. 4(c) shows an example of a 3D layer-to-layer weave material.

Thus, in certain embodiments, the 3D-preform is a 3D woven preform. The 3D woven preform may, for example, be a 3D woven interlock preform or a 3D orthogonal woven preform. The 3D woven interlock preform may be a 3D angle-interlock woven preform or a 3D layer-to-layer interlock woven preform. FIG. 4 shows an example of a 3D orthogonal weave pattern (FIG. 4(a)), a 3D angle-interlock weave pattern (FIG. 4(b)) and a 3D layer-to-layer weave pattern (FIG. 4(c)). These preforms are semi-interlaced in that the one or more filament(s) transversing two or more layers of the 3D-preform are not interlaced within the layers but are only laid-in orthogonally between the layers. In 3D woven preforms, the layers may consist of non-interlaced fibres.

In 3D orthogonal woven preforms, the fibres are oriented in three orthogonal directions and are interlaced to one another. In 3D angle-interlock woven preforms the one or more filament(s) each or all extend diagonally in a repeating pattern through all of the layers of the preform (i.e. from one surface to the other) and back to hold all of the layers together. The one or more filament(s) are thus in a zig-zag pattern through the cross-section of the 3D-preform. The filaments transversing the layers of the preform in FIG. 4(b) are in a zig-zag pattern (see, for example, the filament labelled A). In layer-to-layer interlock woven preforms the one or more filament(s) each or all repeatedly extend from one layer to one or more adjacent layers and back but not through all of the layers of the preform. For example, in layer-to-layer interlock woven preforms the one or more filament(s) each or all extend from one layer to one adjacent layer and back. In layer-to-layer interlock woven preforms multiple filaments are required to hold all of the layers together. The filaments transversing the layers of the preform in FIG. 4(c) each hold two layers together (see, for example, the filaments labelled A).

Stitching involves inserting the one or more filament(s) through two or more of the layers of the 3D-preform in one direction and then back through the same two or more layers in the opposite direction via a different trajectory/pathway. In certain embodiments, one or more of the stitches are inserted through all of the layers of the 3D-preform. In certain embodiments, all of the stitches are inserted through all of the layers of the 3D-preform. Unlike tufting, each stitch (loop) cannot be pulled back through the material.

Figure 5:
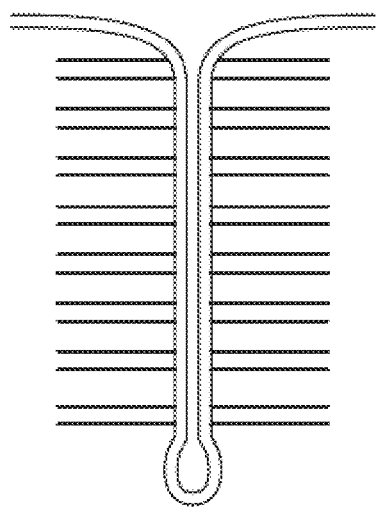
FIG. 5 is a schematic diagram illustrating tufting.

Tufting involves inserting the one or more filament(s) through two or more of the layers of the 3D-preform in one direction and then back through the same two or more layers in the opposite direction via the same trajectory. In certain embodiments, one or more of the filament(s) are inserted through all of the layers to leave a loop of the filament(s) on the surface of the 3D-preform. In certain embodiments, all of the one or more of the filament(s) are inserted through all of the layers to leave a loop of the filament(s) on the surface of the 3D-preform. In certain embodiments, one or more (e.g. all) of the filament(s) are inserted partially through the layers to leave a loop of the filament(s) in the 3D-preform. The loop on the surface of the 3D-preform is not locked in place and only remains in position due to frictional forces acting on it. FIG. 5 shows an example of tufting. In certain embodiments, the one or more tufted filament(s) may each independently be cut to remove the loop. Tufting may be continuous, in which the tufts are made using a continuous thread and each tuft (loop) is linked to the next tuft. Alternatively, tufting may be discontinuous, in which the tufts are made using separate threads and the tufts are not linked. In contrast to stitching, each tuft could be pulled back through the material.

Z-pinning involves inserting the one or more filament(s) through two or more of the layers of the 3D-preform. Each filament extends only once through the two or more layers of the 3D-preform. In certain embodiments, each of the one or more filament(s) may independently be inserted through all of the layers of the 3D-preform. In certain embodiments, all of the one or more filament(s) are inserted through all of the layers of the 3D-preform. In certain embodiments, one or more (e.g. all) of the filament(s) are inserted partially through the layers of the 3D-preform.

Figure 6:
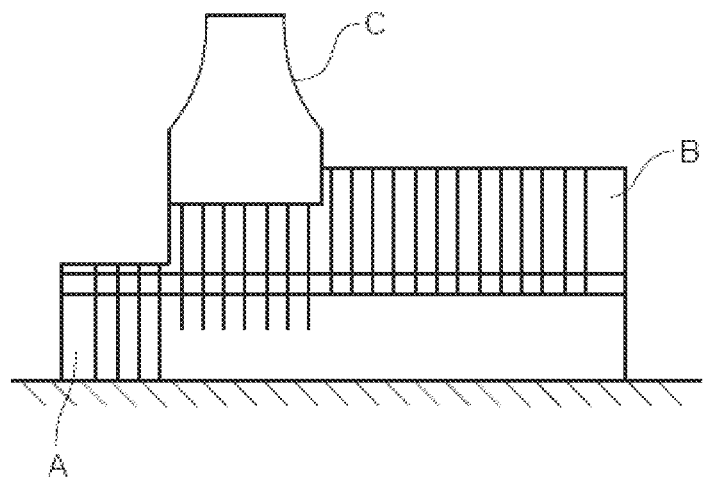
FIG. 6 shows an exemplary method of z-pinning in which A is the uncured stack of layers of reinforced fibres and/or SMA wires, B is the z-pin preform and C is an ultrasonic hammer.

Numerous methods of z-pinning may be used. In certain embodiments, the one or more filament(s) are inserted from a foam bed by pressure and/or acoustic vibration into a 3D-preform which may or may not be partially or fully embedded in an uncured polymer matrix. FIG. 6 shows an exemplary method of z-pinning in which A is the uncured stack of layers of reinforced fibres and/or SMA wires, B is the z-pin preform and C is an ultrasonic hammer.

In certain embodiments, the 3D-preform is a fully-interlaced structure in that three or more sets of fibres (e.g. three orthogonal sets of fibres) are interlaced to form a 3D structure. This may, for example, particularly apply to braided and knitted materials.

The fully-interlaced 3D-preform may, for example, be a fully-interlaced woven 3D-preform, a fully-interlaced braided 3D-preform or a fully-interlaced knitted 3D-preform.

Figure 7:
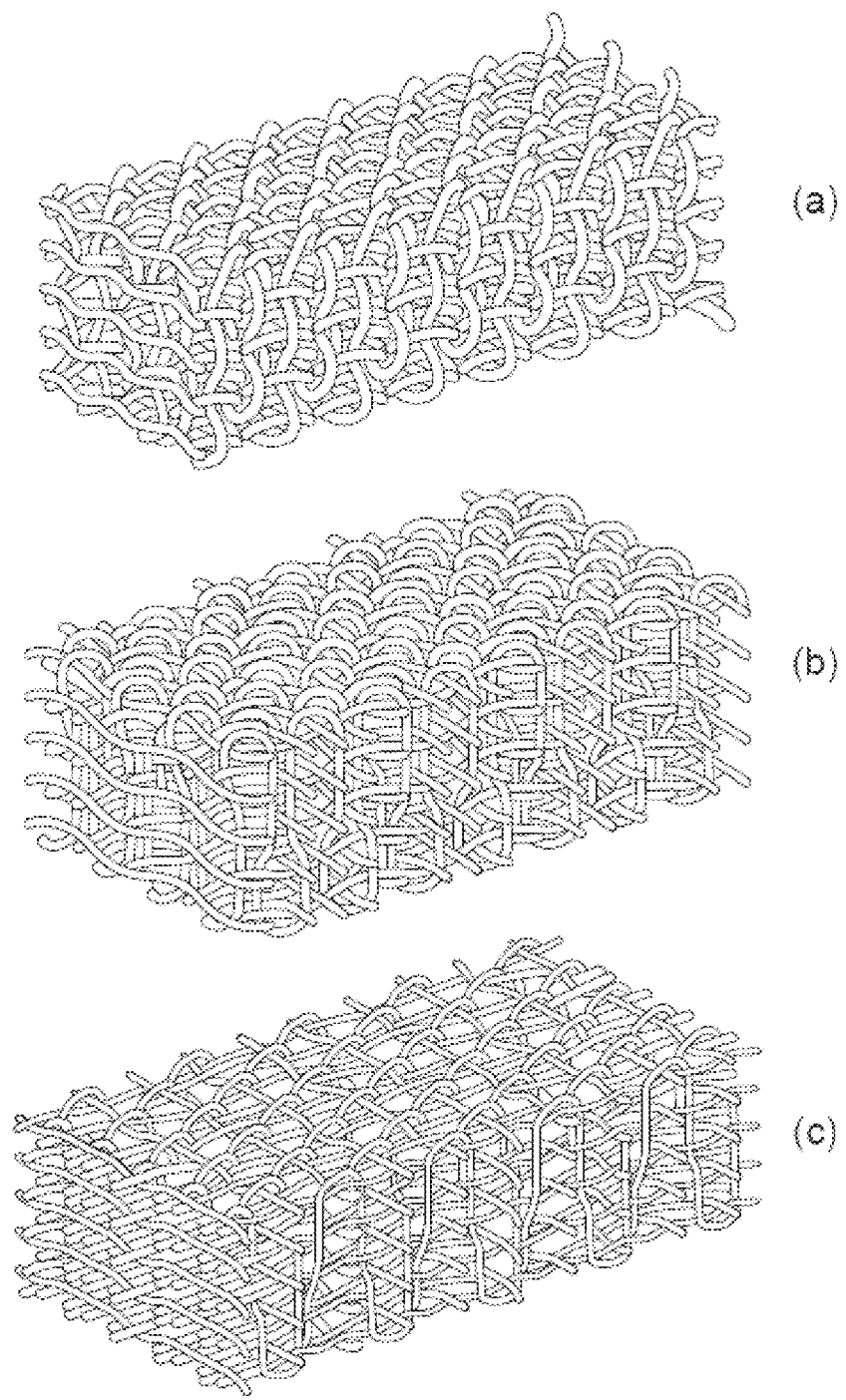
FIG. 7(a) shows an example of a fully-interlaced plain woven material.
FIG. 7(b) shows an example of a fully-interlaced twill woven material.
FIG. 7(c) shows an example of a fully-interlaced satin woven material.

In fully-interlaced woven 3D-preforms, warp yarns may be interlaced with weft yarns at each layer based on the weave pattern in the in-plane principal directions, whereas z-yarns may be interlaced with warp yarns at each layer based on weave pattern in the out-of-plane principal directions. The fully-interlaced woven 3D-preform may, for example, have a fully plain, fully twill or fully satin pattern. The fully-interlaced woven 3D-preform may be a circular fully-interlaced woven 3D-preform. In order to form a circular fully-interlaced woven 3D-preform, circumferential yarns may be interlaced with axial yarns at each circular layer based on the weave pattern in the circumferential direction, whereas radial yarns may be interlaced with axial yarns at each layer based on the weave pattern in the radial direction. The circular fully-interlaced woven 3D-preform may have a fully plain, fully twill or fully satin pattern. The fully-interlaced woven 3D-preform may be a multiaxis woven preform. The multiaxis woven fabric may, for example, consist of 4 or 5 sets of fibres. FIG. 7 shows an example of (a) fully-interlaced plain woven preform, (b) fully-interlaced twill woven preform and (c) fully-interlaced satin woven preform.

Figure 8:
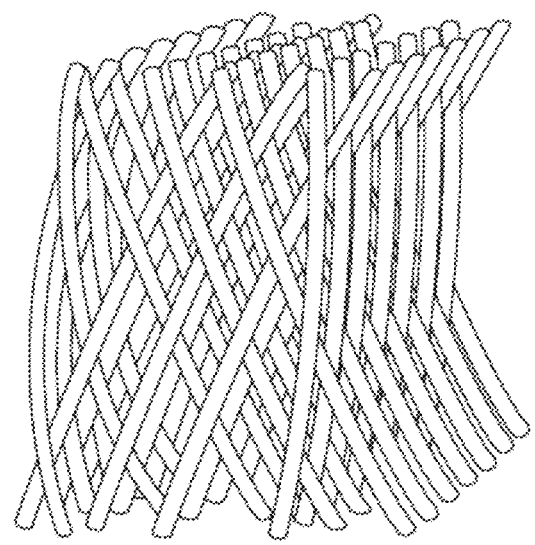
FIG. 8 shows an example of a fully-interlaced braided material.
Figure 9:
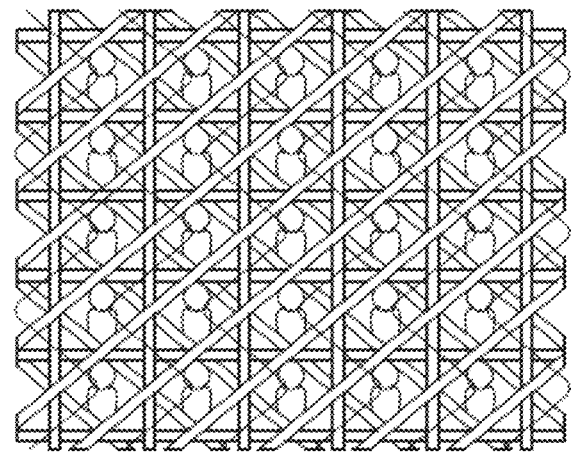
FIG. 9 shows an example of a pattern of a fully-interlaced knitted material.

A fully-interlaced braided 3D-preforms may, for example, be a multiaxis braided preform. FIG. 8 shows an example of a fully-interlaced braided perform. A fully-interlaced knitted 3D-preform may, for example, be a multiaxis knitted preform. FIG. 9 shows an example of a fully-interlaced knitted preform.

The 3D-preform may, for example, have any suitable thickness depending on the intended use of the preform. In certain embodiments, the 3D-preform has a thickness ranging from about 1 mm to about 800 mm. For example, the 3D-preform may have a thickness ranging from about 1 mm to about 700 mm or from about 1 mm to about 600 mm or from about 1 mm to about 500 mm or from about 1 mm to about 400 mm or from about 1 mm to about 300 mm or from about 1 mm to about 200 mm or from about 1 mm to about 100 mm. For example, the 3D-preform may have a thickness ranging from about 1 mm to about 90 mm or from about 1 mm to about 80 mm or from about 1 mm to about 70 mm or from about 1 mm to about 60 mm or from about 5 mm to about 50 mm or from about 10 mm to about 45 mm or from about 20 mm to about 40 mm.

Reinforcing Fibres

The reinforcing fibres may be of any of the usual (non-SMA) types employed in fibre reinforced polymer (FRP) composites. In certain embodiments, the reinforcing fibres have a tensile modulus in excess of 50 GPa. In certain embodiments, the reinforcing fibres have a tensile modulus equal to or greater than about 60 GPa or equal to or greater than about 80 GPa or equal to or greater than about 100 GPa or equal to or greater than about 120 GPa or equal to or greater than about 140 GPa or equal to or greater than about 150 GPa or equal to or greater than about 160 GPa or equal to or greater than about 180 GPa. In certain embodiments, the reinforcing fibres have a tensile modulus in excess of 200 GPa. Tensile modulus may, for example, be measured by ASTM D3379.

In certain embodiments, the reinforcing fibres may be selected from carbon fibres (including graphite), glass fibres, aramid fibres (e.g. Kevlar®), high modulus polyethylene fibres, boron fibres or a combination thereof. In certain embodiments, the reinforcing fibres are one of carbon fibres (including graphite), glass fibres, aramid fibres (e.g. Kevlar®), high modulus polyethylene fibres and boron fibres. In certain embodiments, the reinforcing fibres are carbon fibres.

In certain embodiments, carbon fibres have a tensile modulus equal to or greater than about 200 GPa, for example ranging from about 200 GPa to about 400 GPa or from about 200 GPa to about 300 GPa. In certain embodiments, glass fibres and/or aramid fibres (e.g. Kevlar®) and/or ultra high molecular weight polyethylene fibres have a tensile modulus equal to or greater than about 50 GPa, for example ranging from about 50 GPa to about 200 GPa or from about 50 GPa to about 150 GPa or from about 50 GPa to about 100 GPa.

The reinforcing fibres may, for example, be carbon fibres having a diameter ranging from about 5 μm to about 10 μm, for example from about 6 μm to about 9 μm, for example from about 7 μm to about 8 μm.

The reinforcing fibres may, for example, be present in tows (untwisted bundles of fibres). The tows may, for example, comprise from about 1000 (1 k) to about 50,000 individual fibres (e.g. 48 k). For example, the tows may include from about 1000 to about 40,000 or from about 1000 to about 30,000 or from about 1000 to about 20,000 or from about 1000 to about 10,000 or from about 2000 to about 9000 or from about 3000 to about 8000 or from about 4000 to about 7000 individual fibres.

SMA Wires

The SMA wires may also be referred to herein as SMA fibres. Where the specification generally refers to the fibres in each layer, this may include reinforcing fibres and SMA wires.

The wire material may be of any type which offers the stress-strain characteristics of a shape memory alloy system. More particularly such alloys may be formulated such that the capacity of the wires to absorb strain energy at the operating temperature or range thereof of the respective structure may be due to either of the known hysteretic responses of martensitic twinning (shape memory effect) or martensitic transformation (superelasticity) or indeed a combination of the two. In certain embodiments, the alloy is of a type that exhibits predominantly a stress-induced martensitic twinning response at the operating temperature or range thereof. In certain embodiments, the alloy is of a type that exhibits predominantly a stress-induced martensitic transformation response at the operative temperature or range thereof. In certain embodiments, the alloy is of a type that exhibits a combination of stress-induced martensitic twinning and stress-induced martensitic transformation responses at the operating temperature or range thereof.

The currently preferred alloy is of the Ti—Ni type (nitinol) although other candidates may include ternary Ti—Ni—Cu, Ti—Ni—Nb or Ti—Ni—Hf, copper-based SMAs such as Cu—Zn—Al, Cu—Al—Ni, Cu—Al—Zn—Mn, Cu—Al—Ni—Mn or Cu—Al—Mn—Ni or iron-based SMAs such as Fe—Mn—Si, Fe—Cr—Ni—Mn—Si—Co, Fe—Ni—Mn, Fe—Ni—C or Fe—Ni—Co—Ti. In certain embodiments, all SMA wires in the 3D-preform are the same alloy.

The SMA wires may be of a composition and in a proportion to substantially enhance the impact performance (e.g. resistance) of the fabric at a predetermined operating temperature or range thereof. The volume fraction of the SMA wires in the composite material or in the 3D-preform may typically be in the range 2 to 25%, or more particularly 3 to 12%.

Each SMA wire may, for example, have a diameter ranging from about 50 μm to about 1000 μm. For example, each SMA wire may have a diameter ranging from about 100 μm to about 900 μm or from about 100 μm to about 800 μm or from about 100 μm to about 700 μm or from about 100 μm to about 600 μm or from about 100 μm to about 500 μm or from about 100 μm to about 400 μm or from about 100 μm to about 300 μm. Each SMA wire may, for example, have a diameter ranging from about 200 μm to about 300 μm. For example, each SMA wire may have a diameter ranging from about 210 μm to about 290 μm or from about 220 μm to about 280 μm or from about 230 μm to about 270 μm or from about 240 μm to about 260 μm.

In a variant of some embodiments, the SMA wires are not of circular cross-section but have an elliptical, oval, or otherwise "flattened" cross-section which is substantially longer in a first dimension than in a second dimension perpendicular to the first. The non-circular cross-section SMA wires may, for example, be woven into layers of the 3D-preform with the longer dimension generally parallel to the plane of the layer. SMA wires with a flattened cross-section may particularly be used such that the SMA wires have the same or smaller thickness as the reinforcing fibres without reducing the amount of SMA that is used in each wire. It may, for example, be particularly advantageous to use flattened SMA wires to obtain thin layers.

Where the SMA wire has an elliptical, oval or otherwise flattened cross-section, the SMA wire may have a major cross-sectional diameter ranging from about 200 μm to about 400 μm or from about 200 μm to about 350 μm or from about 250 μm to about 350 μm or from about 260 μm to about 340 μm or from about 270 μm to about 330 μm or from about 280 μm to about 320 μm. The SMA wire may, for example, have a minor cross-sectional diameter ranging from about 250 μm to about 350 μm or from about 260 μm to about 340 μm or from about 270 μm to about 330 μm or from about 280 μm to about 320 μm.

Compared to circular wires of the same cross-sectional area this may achieve a reduction in the overall thickness of the preform. In addition, the greater surface area compared to a circular wire may improve the bonding of the SMA into the matrix.

Similarly, for a given thickness a single flat wire may have the same volume of SMA as a combination of two or more circular wires, but should be tougher due to the greater homogeneous volume. There may also be cost advantages as, per unit volume of SMA material, the single wire should be cheaper to produce.

The SMA wires will normally function in a purely passive sense, in that they are not intended to change shape in response to temperature change in use of the respective structure and no means are provided for deliberately applying an electrical voltage to the wires or otherwise initiating their thermal transformation, in contrast to known active structures which employ heated SMA elements to impart motion or apply a force.

The SMA wires will also not normally be prestrained within the woven preform. However either of those measures may be employed; for example it might be possible to temporarily repair a damaged structure or avoid catastrophic failure by reversing its deformation by heating. Other functionality may also be exhibited in the passive role; for example the SMA wires may impart enhanced damping or other energy absorbing properties to the structure or provide lightning strike protection or other electrical bonding.

Polymer Matrix

The matrix material in a structure according to some embodiments may be of any of the usual types employed in FRP composites. For example, the matrix material may be a thermosetting resin or a thermoplastic resin, although thermosets are currently preferred due to their lower processing temperatures which imply fewer constraints on the transformation temperature of the SMA which is incorporated.

In certain embodiments, the polymer matrix is an epoxy resin, an acrylic resin, a polyester, a polyvinyl ester, a polyurethane, a phenolic resin, an amino resin, a furan resin, a bismaleimide, a cyanate ester, a polyimide, a phthalonitrile or a polysilazane. In certain embodiments, the polymer matrix is an epoxy resin.

Methods of Manufacture

There is also provided herein a method of making a composite material according to any aspect or embodiment disclosed herein. There is further provided herein a method of making a 3D-preform according to any aspect or embodiment disclosed herein.

Conventional FRP composite fabrication methods can be employed with some embodiments.

The method of making a composite material may, for example, include making a 3D-preform embedded in an uncured polymer matrix and curing the polymer matrix.

In certain embodiments, the method includes making a 3D-preform, applying a polymer matrix to the 3D-preform and curing the polymer matrix with the 3D-preform embedded therein.

In certain embodiments, the method includes making a preform by stacking layers of reinforcing fibres, SMA or a combination thereof embedded in a polymer matrix, inserting one or more filament(s) transversing two or more of the layers to make a 3D-preform, and curing the polymer matrix. The layers may, for example, be pre-preg layers (layers of reinforcing fibres, SMA wires or a combination thereof that has been pre-impregnated with the polymer matrix). In certain embodiments, the method includes making a preform by stacking layers of reinforcing fibres, SMA or a combination thereof, applying a polymer matrix, inserting one or more filament(s) transversing two or more of the layers to make a 3D-preform, and curing the polymer matrix. In certain embodiments, the one or more filament(s) transversing two or more of the layers are inserted by stitching, tufting or z-pinning. In certain embodiments, the one or more filament(s) transversing two or more of the layers are inserted by z-pinning. In certain embodiments, the method includes making a preform by stacking layers of reinforcing fibres, SMA or a combination thereof, inserting one or more filament(s) transversing two or more of the layers to make a 3D-preform, applying a polymer matrix, and curing the polymer matrix. In certain embodiments, the one or more filament(s) transversing two or more of the layers are inserted by stitching, tufting or z-pinning. In certain embodiments, the one or more filament(s) transversing two or more of the layers are inserted by z-pinning.

The method of making a 3D-preform may, for example, include providing reinforcing fibres and SMA wires and making the 3D-preform by one or more of weaving, braiding, knitting, stitching, tufting and z-pinning. The 3D-preform may, for example, be made using the existing apparatus for weaving, braiding, knitting, stitching, tufting and z-pinning. The existing apparatus may, for example, be adapted depending on the particular desired 3D-preform to be made.

Uses and Articles of Manufacture

There is also provided herein the use of the composite materials and/or 3D-preforms according to any aspect or embodiment disclosed herein to make an article of manufacture. There is also provided herein articles of manufacture made from or including the composite materials and/or 3D-preforms disclosed herein.

In certain embodiments, the article of manufacture is a part for a vehicle. In certain embodiments, the article of manufacture is a part for an aircraft, a marine craft or an automobile.

In certain embodiments, the article of manufacture is a forward-facing part of a vehicle.

In certain embodiments, the article of manufacture is a leading edge, nose cone or nacelle.

In certain embodiments, the article of manufacture is a protective cover. In certain embodiments, the article of manufacture is a protective cover for a battery, a protective cover for a fuel tank or a protective cover for a braking system.

The foregoing broadly describes certain embodiments of some embodiments without limitation. Variations and modifications as will be readily apparent to those skilled in the art are intended to be within the scope of some embodiments as defined in and by the appended claims.

EXAMPLES

In certain embodiments, the 3D-preform consists of non-interlaced layers of reinforcing fibres, SMA wires or a combination thereof, wherein the layers are held together by tufted or stitched filaments transversing all the layers. The tufted filaments are reinforcing fibres, SMA wires or a combination thereof. In certain embodiments, the non-interlaced layers include a stabilising fibre or thread to form a non-crimp fabric. In certain embodiments, the stabilising fibre or thread is polyester. The SMA wires may, for example, be Ti—Ni alloy.

Figure 10:
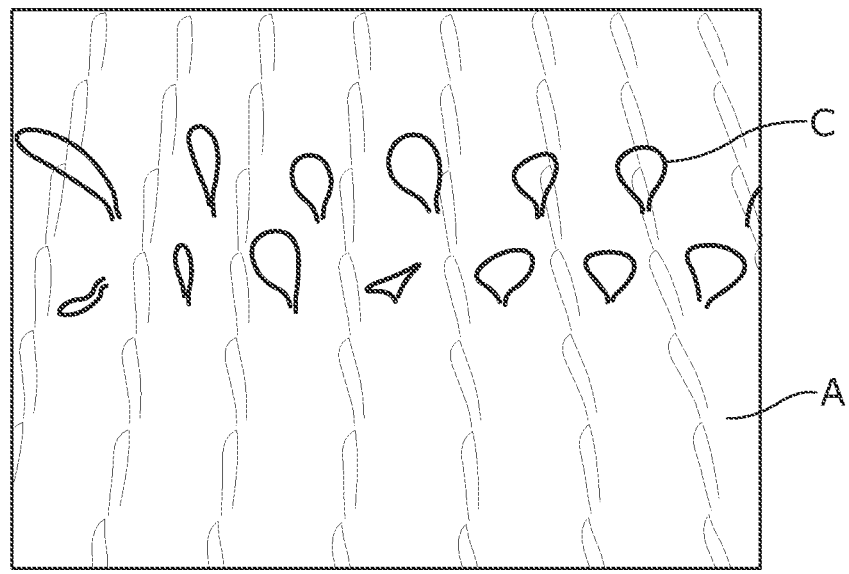
FIG. 10 shows photographs of opposite surfaces of a tufted preform in which A is carbon fibres, B is a stabilising thread and C is a tufted SMA wire.
Figure 10:
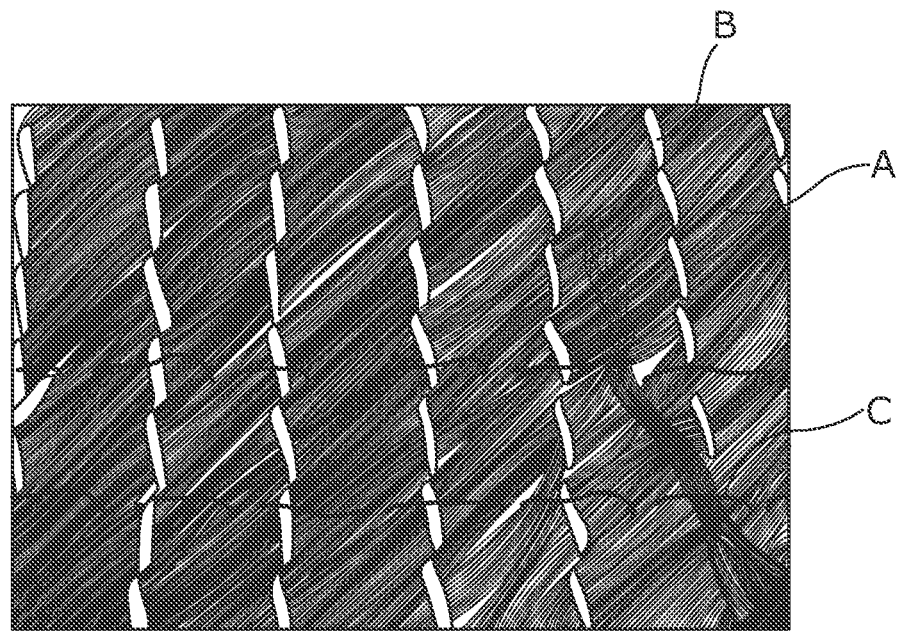

The photographs in FIG. 10 show opposite surfaces of an exemplary 3D-preform including a non-crimp fabric made from carbon fibres (labelled A), a polyester stabilising thread (labelled B) and tufts of SMA wire (e.g. Ti—Ni) (labelled C). However, in certain other embodiments, the SMA wire may be present in the 2D layers of the preform (together with the reinforcing fibres) and carbon fibres (e.g. tows of carbon fibres) can be used to form the tufts.

In certain embodiments, the 3D-preform is an orthogonal 3D woven preform consisting of non-interlaced layers of reinforcing fibres or reinforcing fibres and SMA wires that are woven together by a reinforcing fibre, SMA wire or combination thereof. In certain embodiments, the non-interlaced layers are orientated such that the fibres in each layer are perpendicular to the fibres in the adjacent layer(s). In certain embodiments, the non-interlaced layers including reinforcing fibres and SMA wires are present only at one or both of the outermost surfaces of the preform. The outermost surface of the preform may, for example, each include one or more (e.g. up to five) layers including reinforcing fibres and SMA wires. In certain embodiments, the non-interlaced layers including reinforcing fibres and SMA wires may be distributed throughout the preform. The non-interlaced layers including reinforcing fibres and SMA wires may be distributed regularly or irregularly throughout the preform.

Figure 11:
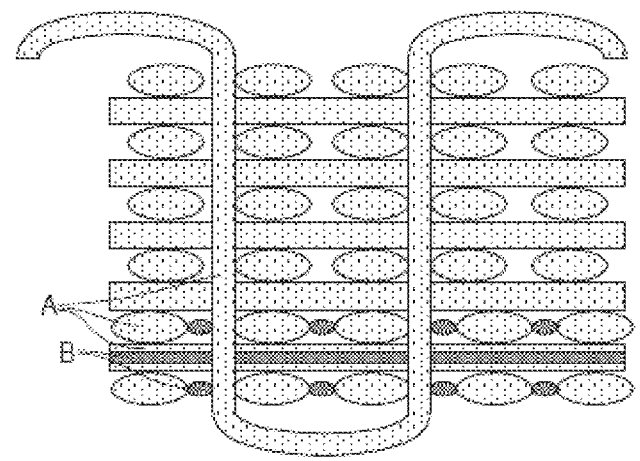
FIG. 11 shows exemplary schematic cross-sections of an orthogonal 3D-woven preform in which A is carbon fibres and B is SMA wires.
Figure 11:
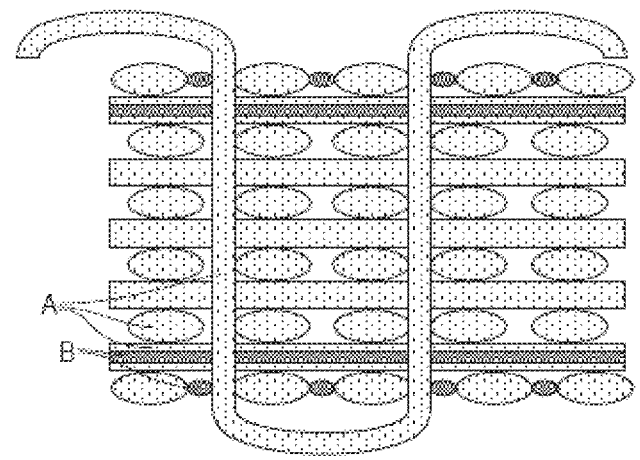

FIGS. 11(a) and 11(b) show orthogonal 3D woven preforms including non-interlaced layers of carbon fibres and non-interlaced layers of carbon fibres and SMA wires (e.g. Ti—Ni) which are woven together with a tow of carbon fibres. The non-interlaced layers are orientated such that the fibres in each layer are perpendicular to the fibres in the adjacent layer(s). One SMA wire is located between each pair of tows of carbon fibres. Tows of carbon fibres are labelled A and the SMA wires are labelled B (dark shading). In FIG. 11(a) three consecutive outermost layers of one face of the preform include reinforcing fibres and SMA wires. In FIG. 11(b) two consecutive outermost layers of both faces of the preform include reinforcing fibres and SMA wires.

Figure 12:
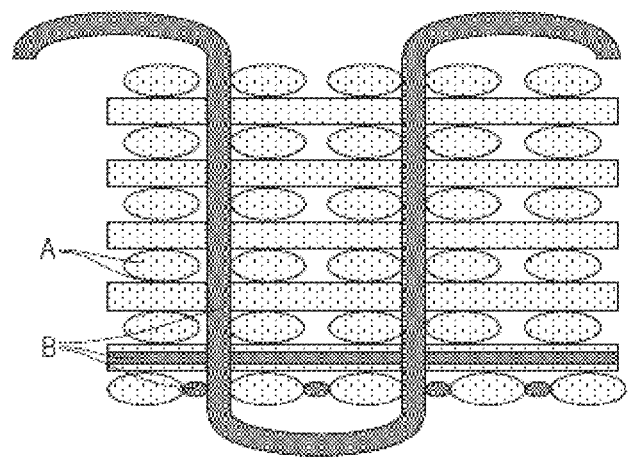
FIG. 12 shows an exemplary schematic cross-section of an orthogonal 3D-woven preform in which A is carbon fibres and B is SMA wires.

FIG. 12 shows an orthogonal 3D woven preform including non-interlaced layers of carbon fibres and non-interlaced layers of carbon fibres and SMA wires (e.g. Ti—Ni) which are woven together with a SMA wire (e.g. Ti—Ni). The non-interlaced layers are orientated such that the fibres in each layer are perpendicular to the fibres in the adjacent layer(s). One SMA wire is located between each pair of tows of carbon fibres. Tows of carbon fibres are labelled A and the SMA wires are labelled B (dark shading). Two consecutive outermost layers of one face of the preform include reinforcing fibres and SMA wires.

Figure 13:
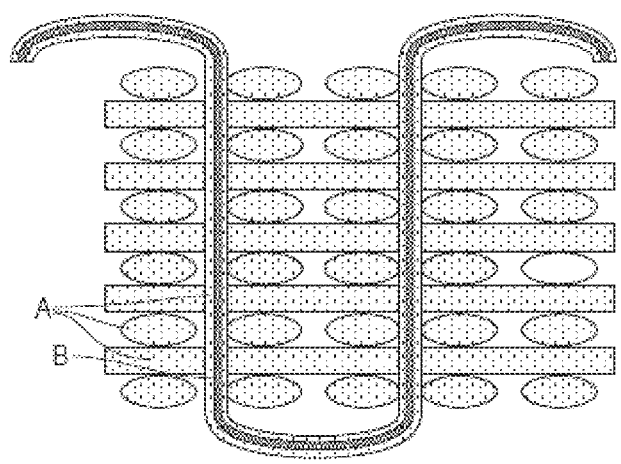
FIG. 13 shows an exemplary schematic cross-section of an orthogonal 3D-woven preform in which A is carbon fibres and B is SMA wires.

FIG. 13 shows an orthogonal 3D woven preform including non-interlaced layers of carbon fibres which are woven together with tow of carbon fibres and SMA wires (e.g. Ti—Ni). The tows of carbon fibres and SMA wires that are used to weave the layers together are separate (not combined). The SMA wire linking the layers together depicted in FIG. 13 is located behind (deeper in the material) the carbon tow that is depicted as linking the layers together. The non-interlaced layers are orientated such that the fibres in each layer are perpendicular to the fibres in the adjacent layer(s). Tows of carbon fibres are labelled A and the SMA wires are labelled B (darker shading).

In certain embodiments, an epoxy resin matrix may be used with these preforms to form a composite material.

In certain embodiments, the carbon fibres of these preforms may be tows of carbon fibres including a flat bundle of approximately 6000 individual fibres of 7.1 μm diameter.

In certain embodiments, the SMA wires of these preforms are Ni—Ti wires of approximately 250 μm diameter (e.g. ranging from about 150 μm to about 300 μm).

In certain embodiments, the SMA wires of these preforms are flattened Ni—Ti wires that are rolled from a circular wire of approximately 250 μm diameter into an oval cross-section with a major cross-sectional dimension of approximately 310 μm and a minor cross-sectional dimension of approximately 190 μm.

The person skilled in the art realizes that some embodiments is by no means limited to the preferred embodiments described above. On the contrary, many modifications and variations are possible within the scope of the appended claims.

Additionally, variations to the disclosed embodiments can be understood and effectuated by the skilled person in practicing some embodiments, from a study of the drawings, the disclosure, and the appended claims. In the claims, the word "including" does not exclude other elements or steps, and the indefinite article "a" or "an" does not exclude a plurality. The mere fact that certain features are recited in mutually different dependent claims does not indicate that a combination of these features cannot be used to advantage.

The invention claimed is:

1. A composite material, comprising:
   a polymer matrix with a three-dimensional (3D) preform embedded therein,
   wherein the 3D-preform includes reinforcing fibres and shape memory alloy (SMA) wires.

2. The composite material of claim 1, wherein the 3D-preform includes at least two layers, each independently including reinforcing fibres, SMA wires or a combination thereof, wherein the layers are stacked on top of each other and are held together by at least one filament transversing at least two of the layers.

3. The composite material of claim 1, wherein the 3D-preform includes combination tows of reinforcing fibre and SMA wire.

4. The composite material of claim 2, wherein the at least one filament transversing the at least two of the layers is reinforcing fibre, SMA wire or a combination thereof.

5. The composite material of claim 2, wherein each of the layers is independently non-interlaced (e.g. non-crimp fabric or non-crimp woven fabric), woven, braided or knitted.

6. The composite material of claim 2, wherein the at least one filament transversing the at least two of the layers is woven, stitched, tufted or z-pinned.

7. The composite material of claim 1, wherein the 3D-preform is an orthogonal three-dimensional woven preform, an angle-interlock three-dimensional woven preform or a layer-to-layer three-dimensional woven preform.

8. The composite material of claim 1, wherein the 3D-preform is a fully interlaced woven preform, a fully braided preform or a fully knitted preform.

9. The composite material of claim 1, wherein the SMA wires are each independently of a composition and in a proportion to substantially enhance the impact performance or penetration resistance of the structure at a predetermined operating temperature or range thereof.

10. The composite material of claim 1, wherein each SMA is independently selected from the group comprising Ti—Ni, Ti—Ni—Cu, Ti—Ni—Nb, Ti—Ni—Hf, Cu—Zn—Al, Cu—Al—Ni, Cu—Al—Zn—Mn, Cu—Al—Ni—Mn, Cu—Al—Mn—Ni, Fe—Mn—Si, Fe—Cr—Ni—Mn—Si—Co, Fe—Ni—Mn, Fe—Ni—C and Fe—Ni—Co—Ti alloys.

11. The composite material of claim 1, wherein the volume fraction of the SMA wires in the composite material ranges from about 2% to about 25%.

12. The composite material of claim 2, wherein the SMA wires each independently have a cross-section that is substantially longer in a first dimension than in a second dimension perpendicular to the first and are positioned in the 3D preform such that the longer dimension is generally parallel to the plane of the layers.

13. The composite material of claim 1, wherein the reinforcing fibres each independently have a tensile modulus in excess of 50 GPa, for example in excess of 200 GPa.

14. The composite material of claim 1, wherein the reinforcing fibres are each independently selected from carbon fibres, glass fibres, aramid fibres, polyethylene fibres and boron fibres.

15. A three-dimensional (3D) preform, comprising:
reinforcing fibres and
shape memory alloy (SMA) wires.

16. The 3D-preform of claim 15, wherein the 3D-preform includes at least two layers, each independently including reinforcing fibres, SMA wires or a combination thereof, and wherein the layers are stacked on top of each other and are held together by at least one filament transversing at least two of the layers.

17. The 3D-preform of claim 15, wherein the 3D-preform includes combination tows of reinforcing fibres and SMA wire.

18. The 3D-preform of claim 16, wherein the at least one filament transversing the at least two of the layers is reinforcing fibre, SMA wire or a combination thereof.

19. The 3D-preform of claim 16, wherein each of the layers is independently non-interlaced (e.g. non-crimp fabric or non-crimp woven fabric), woven, braided or knitted.

20. The 3D-preform of claim 16, wherein the at least one filament transversing the at least two of the layers is/are woven, stitched, tufted, z-pinned or a combination thereof.

21. The 3D-preform of claim 16, wherein the 3D-preform is an orthogonal three-dimensional woven preform, an angle-interlock three-dimensional woven preform or a layer-to-layer three-dimensional woven preform.

22. The 3D-preform of claim 15, wherein the 3D-preform is a fully interlaced woven preform, a fully braided preform or a fully knitted preform.

23. The 3D-preform of claim 15, wherein the SMA wires are each independently of a composition and in a proportion to substantially enhance the impact performance or penetration resistance of the structure at a predetermined operating temperature or range thereof.

24. The 3D-preform of claim 15, wherein the SMA is selected from the group comprising Ti—Ni, Ti—Ni—Cu, Ti—Ni—Nb, Ti—Ni—Hf, Cu—Zn—Al, Cu—Al—Ni, Cu—Al—Zn—Mn, Cu—Al—Ni—Mn, Cu—Al—Mn—Ni, Fe—Mn—Si, Fe—Cr—Ni—Mn—Si—Co, Fe—Ni—Mn, Fe—Ni—C and Fe—Ni—Co—Ti alloys.

25. The 3D-preform of claim 15, wherein the volume fraction of the SMA wires in the composite material ranges from about 2% to about 25%.

26. The 3D-preform any one of claim 15 wherein the SMA wires each independently have a cross-section that is substantially longer in a first dimension than in a second dimension perpendicular to the first and are positioned in the 3D preform such that the longer dimension is generally parallel to the plane of the layers.

27. The 3D-preform of claim 15, wherein the reinforcing fibres each independently have a tensile modulus in excess of 50 GPa, for example in excess of 200 GPa.

28. The 3D-preform of claim 15, wherein the reinforcing fibres are each independently selected from carbon fibres, glass fibres, aramid fibres, polyethylene fibres and boron fibres.

29. A method of making the composite material according to claim 1, the method comprising:
forming a 3D-preform, applying a polymer matrix to the 3D-preform, and
curing the polymer matrix with the 3D-preform embedded therein.

30. A method of making a 3D-preform according to claim 15, the method comprising:
providing the reinforcing fibres and SMA wires, and
making a 3D-preform by one or more of weaving, braiding, knitting, stitching, tufting and z-pinning.

* * * * *